United States Patent
Chu et al.

(10) Patent No.: US 12,278,894 B2
(45) Date of Patent: Apr. 15, 2025

(54) SYSTEMS AND METHODS FOR SECURE AUTHENTICATION BETWEEN APPLICATION IN QUANTUM COMPUTING

(71) Applicant: Morgan Stanley Services Group Inc., New York, NY (US)

(72) Inventors: Kwok Hin Chu, Bromley (GB); Robert Dailey, Newtown, PA (US)

(73) Assignee: Morgan Stanley Services Group Inc., New York, NY (US)

(*) Notice: Subject to any disclaimer, the term of this patent is extended or adjusted under 35 U.S.C. 154(b) by 0 days.

(21) Appl. No.: 18/296,425

(22) Filed: Apr. 6, 2023

(65) Prior Publication Data
US 2024/0340168 A1   Oct. 10, 2024

(51) Int. Cl.
*H04L 9/08* (2006.01)
*H04L 9/16* (2006.01)

(52) U.S. Cl.
CPC .......... *H04L 9/0852* (2013.01); *H04L 9/0869* (2013.01); *H04L 9/16* (2013.01)

(58) Field of Classification Search
CPC ........ H04L 9/0852; H04L 9/0869; H04L 9/16
See application file for complete search history.

(56) References Cited

U.S. PATENT DOCUMENTS

| | | | | |
|---|---|---|---|---|
| 11,108,556 B2* | 8/2021 | Liderman | ............ | H04L 9/3268 |
| 11,316,677 B2* | 4/2022 | Ko | ............ | H04L 9/12 |
| 11,424,931 B2* | 8/2022 | Seibel | ............ | G06F 21/606 |
| 2003/0163697 A1* | 8/2003 | Pabla | ............ | H04L 9/0838 |
| | | | | 713/171 |
| 2005/0172282 A1* | 8/2005 | Shenfield | ............ | H04L 67/02 |
| | | | | 717/174 |
| 2005/0182966 A1* | 8/2005 | Pham | ............ | G06F 21/606 |
| | | | | 726/5 |
| 2006/0056630 A1 | 3/2006 | Zimmer et al. | | |
| 2006/0062392 A1* | 3/2006 | Lee | ............ | H04L 9/0852 |
| | | | | 380/278 |
| 2011/0047381 A1* | 2/2011 | Ganesan | ............ | H04L 9/0819 |
| | | | | 713/169 |
| 2012/0221739 A1* | 8/2012 | Schroeder, Jr. | ..... | H04L 65/1016 |
| | | | | 709/229 |
| 2018/0255033 A1* | 9/2018 | Kanaya | ............ | H04W 12/03 |

(Continued)

*Primary Examiner* — Jung W Kim
*Assistant Examiner* — Alan L Kong
(74) *Attorney, Agent, or Firm* — PEARL COHEN ZEDEK LATZER BARATZ LLP

(57) ABSTRACT

A system and method for secure authentication between applications that may be attacked with an attack originating from a quantum computer is provided. The systems and methods can involve generating a plurality of keys, wherein each key of the plurality of keys is unique and determining one or more pairs of applications from a plurality of applications, wherein each pair can include applications that can connect. The systems and methods can also involve upon receiving a request from a first application of the plurality of applications to connect to a second application of the plurality of applications finding the pair of the one or more pairs that includes both the first application and the second application and associating one key of the plurality of keys to the pair, and performing by the first application and the second application, mutual authentication using the one key.

17 Claims, 4 Drawing Sheets

(56) References Cited

U.S. PATENT DOCUMENTS

| | | |
|---|---|---|
| 2019/0149327 A1* | 5/2019 | Yuan .................... H04L 9/0852 380/255 |
| 2020/0280436 A1 | 9/2020 | Nix |
| 2021/0014054 A1 | 1/2021 | Edwards |
| 2021/0306144 A1 | 9/2021 | Chen |
| 2021/0306146 A1 | 9/2021 | Chen |
| 2022/0038269 A1* | 2/2022 | Nix |
| 2022/0209943 A1* | 6/2022 | Syrivelis ............... H04L 63/061 |
| 2022/0391267 A1* | 12/2022 | Dey .................. G06F 16/90335 |
| 2023/0020193 A1* | 1/2023 | Williams .............. H04L 9/0877 |

\* cited by examiner

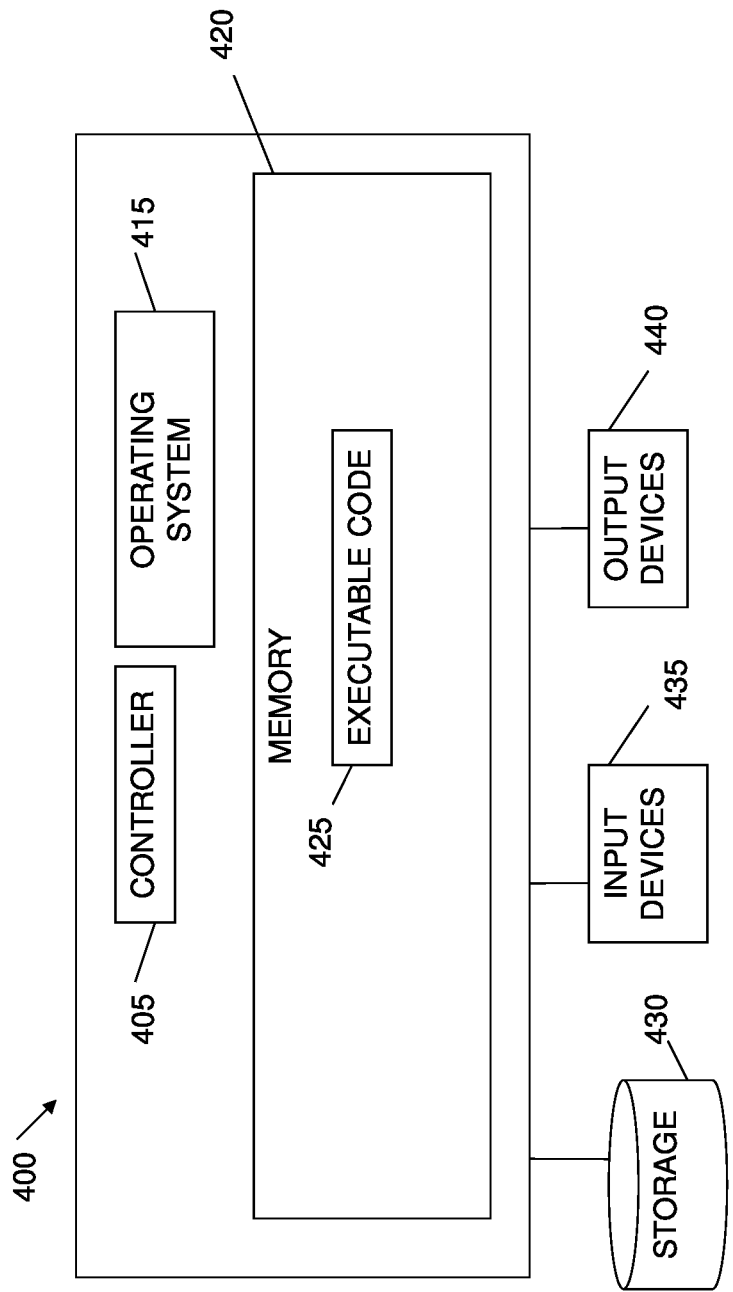

SYSTEMS AND METHODS FOR SECURE AUTHENTICATION BETWEEN APPLICATION IN QUANTUM COMPUTING

FIELD OF THE INVENTION

The invention relates generally systems and methods for secure authentication between application in quantum computing. In particular, to systems and methods that perform secure authentication via symmetric authentication keys to mitigate quantum computer threats.

BACKGROUND

Currently, many applications using the public internet use a public key authentication to authenticate during operation. There exists known standards for secure sessions on the public internet, for example, Transport Layer Security (TLS) and Internet Security Protocol (IPSec). Public key authentication via the respective protocols typically provides adequate security when an attack comes from a conventional computer. However, when the attack comes from quantum computers, existing known standards for secure sessions can be vulnerable.

Public key authentication can be broken via a quantum computer using Shor's algorithm. Therefore, it can be desirable to provide an authentication over any network, public or private, that is not vulnerable to quantum computers.

SUMMARY OF THE INVENTION

One advantage of the invention can include an ability to have a secure session over any network, public or private, that may not be broken by a quantum computer. Another advantage of the invention can include, increased access control by pre-authorizing access of one application by another application.

In one aspect, the invention involves a method for secure authentication between applications that may be attacked with an attack originating from a quantum computer. The method can involve generating, by a computing device, a plurality of keys, wherein each key of the plurality of keys is unique. The method can also involve determining, by the computing device, one or more pairs of applications from a plurality of applications, wherein each pair comprises applications that can connect. The method can also involve upon receiving a request from a first application of the plurality of applications to connect to a second application of the plurality of applications, by the computing device, finding the pair of the one or more pairs that includes both the first application and the second application and associating one key of the plurality of keys to the pair. The method can also involve performing by the first application and the second application, mutual authentication using the one key.

In some embodiments, the method involves removing by the computing device, the one key from the plurality of keys. In some embodiments, the method involves after a first session between the first application and the second application ends, upon receiving a second request from the first application of the plurality of applications to connect to the second application of the plurality of applications or from the second application of the plurality of applications to connect to the first application, finding the pair of the one or more pairs that includes both the first application and the second application and associating a second key of the plurality of keys to the pair, wherein the second key is different than the one key.

In some embodiments, the method involves, upon receiving a request from a third application of the plurality of applications to connect to a fourth application of the plurality of applications, finding the pair of the one or more pairs that includes both the third application and the fourth application and associating a second key of the plurality of keys to the pair, wherein the second key is different than the one key.

In some embodiments, the method involves storing the plurality of keys in a hardware security module. In some embodiments, wherein each application of the plurality of applications registers with a unique identification and a passphrase. In some embodiments, the method involves wherein if a number of the plurality of keys is less than a threshold, new keys are generated and added to the plurality of keys.

In some embodiments, the method involves wherein each of the plurality of keys is generated by a quantum random number generator, a quantum key distribution device, a hardware security module or any combination thereof. In some embodiments, wherein the plurality of applications connect via Transport Layer Security or Internet Protocol Security (IPSec).

In another aspect, the invention includes a system for secure authentication between applications that may be attacked with an attack originating from a quantum computer. The system can include a plurality of applications that can transmit requests for connection to at least one other of the plurality of applications. The system can include a processor configured to generate a plurality of keys, wherein each key of the plurality of keys is unique. The processor can be configured to determine one or more pairs of applications from the plurality of applications, wherein each pair comprises applications that can connect. The processor can be configured to upon receiving a request from a first application of the plurality of applications to connect to a second application of the plurality of applications find the pair of the one or more pairs that includes both the first application and the second application and associating one key of the plurality of keys to the pair. The processor can be configured to transmit the one key to the first application and the second application, such that the first application and the second application performs mutual authentication using the one key.

In some embodiments, the processor is further configured to remove by the computing device, the one key from the plurality of keys. In some embodiments, the processor is further configured to after a first session between the first application and the second application ends, upon receiving a second request from the first application of the plurality of applications to connect to the second application of the plurality of applications or from the second application of the plurality of applications to connect to the first application, find the pair of the one or more pairs that includes both the first application and the second application and associating a second key of the plurality of keys to the pair, wherein the second key is different than the one key.

In some embodiments, the processor is further configured to upon receiving a request from a third application of the plurality of applications to connect to a fourth application of the plurality of applications, finding the pair of the one or more pairs that includes both the third application and the fourth application and associating a second key of the plurality of keys to the pair, wherein the second key is different than the one key.

In some embodiments, the processor is further configured to store the plurality of keys in a hardware security module.

In some embodiments, each application of the plurality of applications registers with a unique identification and a passphrase. In some embodiments, if a number of the plurality of keys is less than a threshold, new keys are generated and added to the plurality of keys.

In some embodiments, wherein each of the plurality of keys is generated by a quantum random number generator, a quantum key distribution device, a hardware security module or any combination thereof. In some embodiments, wherein the plurality of applications connect via Transport Layer Security or Internet Protocol Security (IPSec).

In another aspect, the invention includes a non-transitory computer readable storage medium storing a set of instructions for causing a computer to perform secure authentication between applications in quantum computing, by performing the operations of generating a plurality of keys, wherein each key of the plurality of keys is unique. The set of instructions further cause the computer to determining one or more pairs of applications from a plurality of applications, wherein each pair comprises applications that can connect. The set of instructions further cause the computer to upon receiving a request from a first application of the plurality of applications to connect to a second application of the plurality of applications finding the pair of the one or more pairs that includes both the first application and the second application and associating one key of the plurality of keys to the pair. The set of instructions further cause the computer to performing by the first application and the second application, mutual authentication using the one key.

BRIEF DESCRIPTION OF THE DRAWINGS

Non-limiting examples of embodiments of the disclosure are described below with reference to figures attached hereto that are listed following this paragraph. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, can be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIG. 4 is a block diagram of a computing device which can be used with embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the invention can be practiced without these specific details. In other instances, well-known methods, procedures, and components, modules, units and/or circuits have not been described in detail so as not to obscure the invention.

In general, methods and systems for . . . .

Figure 1:
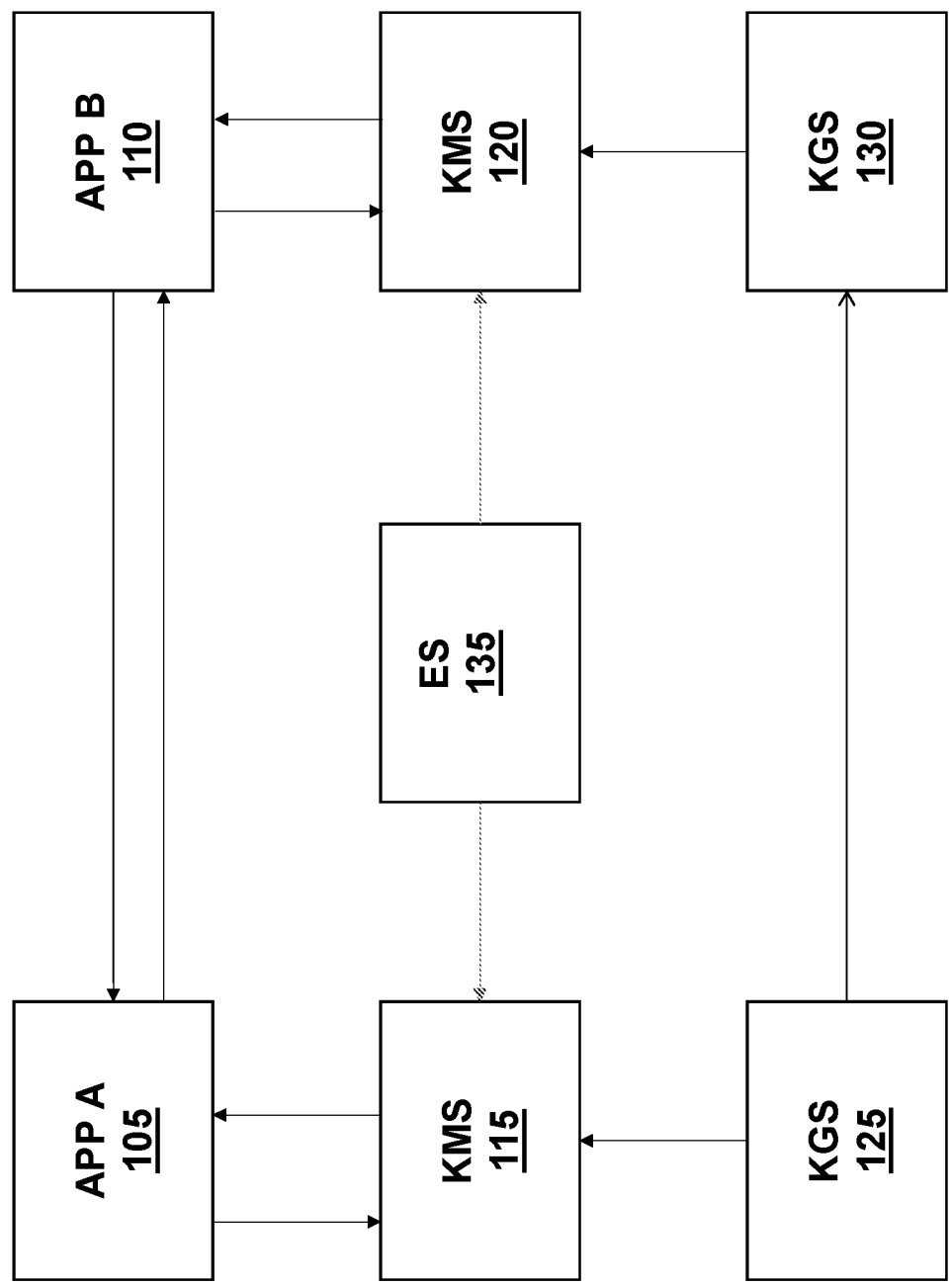
FIG. 1 is a diagram of a system for secure authentication between applications in quantum computing, according to some embodiments of the invention.

FIG. 1 is a diagram of a system architecture 100 for secure authentication between applications in quantum computing, according to some embodiments of the invention. The system architecture 100 can include a first application APP A 105, a second application APP B 110, a Key Management System (KMS) 115, a KMS 120, a Key Generation System (KGS) 125, KGS 130 and an Entitlement Service (ES) 135.

APP A 105 can communication with APP B 110, and KMS 115. APP B 110 can communicate with APP A 105 and KMS 120. The KMS 115 can communication with the KGS 125, the APP A 105, ES 135 and with the KGS 130. The KMS 120 can communicate with the KGS 130, ES 135 and the APP B 110. The communication can be wired or wireless (e.g., on protocol EAP-TLS 1.2).

In some embodiments, APP A 105 is hosted on first computing device (e.g., a smartphone, a laptop computer, or tablet), APP B 110 is hosted on a second computing device (e.g., a smartphone, a laptop computer, or tablet), the KMS 115 and the KGS 125 are hosted on a third computing device (e.g., a server), and the KMS 120 and the KGS 130 are hosted on a fourth computing device (e.g., a server). In some embodiments, the KMS 115, the KGS 125, the KMS 120 and the KGS 130 are each hosted on their own respective computing devices (e.g., server). In some embodiments, the KMS 115, the KGS 125, the KMS 120 and the KGS 130 are hosted on a single computing device (e.g., server). In various embodiments, all or part of APP A 105, APP B 110, the KMS 115, the KGS 125, the KMS 120 and the KGS 130 are hosted on single or a combination of computing devices in whole or in part. In some embodiments, the configuration of computing devices that APP A 105, APP B 110, the KMS 115, the KGS 125, the KMS 120 and the KGS 130.

In various embodiments, there are N applications, where N is an integer value. In various embodiments, there are M KMS', where M is an integer number. In various embodiments, there are Z KGS' where Z is an integer number.

During operation, the KGS 125 and the KGS 130 can generate one or more keys. The one or more keys can be generated randomly as described below with respect to FIG. 2. The KGS 125 and the KGS 130 can transmit the one or more keys they each generate to the KMS 115 and the KMS 120, respectively. The KGS 125 can transmit the one or more keys it generates to the KGS 130. The KGS 130 can transmit the one or more keys it generates to the KGS 125.

The Entitlement Service (ES) 135 can determine, for a system having a plurality of applications (e.g., N applications, where N is an integer), which applications of the plurality of applications can connect to one another. In some embodiments, after an application (e.g., APP A 105 or APP B 110) is registered to the ES 135, a request can be made by a user from one application (e.g., APP A 105) to the ES 135 to pair with another application, also can be referred to as a target application (e.g., APP B 110). The target application, e.g., in this example APP B 110, can receive a request sent by the ES 135 to pair up with the requesting application, e.g., in this example APP A 105. Once the target application accepts the request, the ES 135 can create a pairing record for the two applications.

In some embodiments, each application can be registered on an ES interface Upon registration, each application can have an associated unique identifier and/or a passphrase. The unique identifier and/or passphrase can be automatically generated by the ES, and/or input by a user, where the user can be an administrator or another computing device. In some embodiments, applications remain registered even after an application unpairs with another application.

In some embodiments, where Transport Layer Security (TLS) is the protocol, the unique identifier can be used as a PSK identity as specified in the Pre-Shared Key Ciphersuites for Transport Layer Security RFC4279. For a system using TLS, the respective passphrase can be used to derive a PSK for the TLS application between the APP A 105 and the KMS 115, or APP B 110 and the KMS 120, or both.

Once APP A 105 sends a request to connect to (e.g., pair with) APP B 110, the ES can determine if APP A 105 and APP B 110 can connect, and if so create a pair. The pair can be sent to the KMS 115.

The KMS 115 and the KMS 120 can retrieve keys from the respective KGS 125 and KGS 130 and keep them in a pool of available keys. When the KMS 115 (or the KMS 120) receives a pair from ES, KMS 115 (or the KMS 120) can associate one or more keys with the pair. The one or more keys associated with the pair can be transmitted to the respective applications in the pair, namely, in this example, APP A 105, APP B 110.

Each key that is associated with a pair can be removed (e.g., deleted) once used to authenticate. This can cause keys to only be used once, thus enhancing security. Keys can be removed from the KMS, KGS, and/or the application.

In some embodiments, multiple keys are associated with a pair. In some embodiments, each time a new session is initiated between applications, a new key is used.

Figure 2:
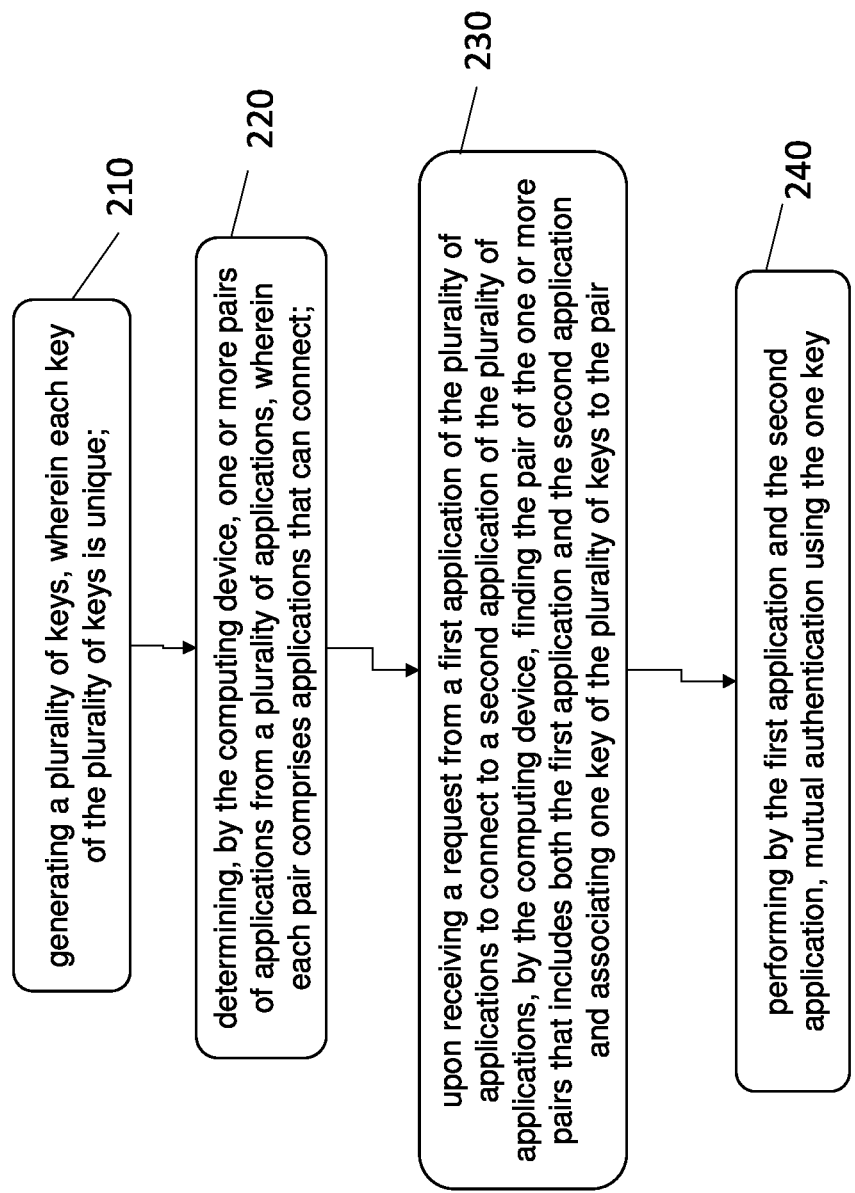
FIG. 2 is a flow chart of a method for secure authentication between applications in quantum computing, according to some embodiments of the invention.

FIG. 2 is a flow chart of a method 200 for secure authentication between applications (e.g., APP A 105 and APP B 110 as described above in FIG. 1) that may be attacked with an attack originating from a quantum computer, according to some embodiments of the invention.

The method can involve generating a plurality of keys (e.g., via the KGS 125 as described above in FIG. 1) (Step 210). Each key of the plurality of keys can be unique. Each key can have a predetermined bit size. The bit size can be based on NIST recommended minimum security strength. In some embodiments, the bit size can be greater than or equal to the NIST recommended minimum security strength. Keys can be randomly generated. The keys can be randomly generated by a quantum random number generator, a quantum key distribution device, a hardware security module or any combination thereof. The number of keys generated can be generated such that no key repeats itself in a human lifetime, for example, a random number generator conforming to NIST SP 800-90A Rev1 standards e.g., with a security strength of 128 bits.

A random number generator conforming to NIST SP 800-90A Rev1 standards e.g., with a security strength of 128 bits, does not repeat in a typical human lifetime even when a single number is generated every nanosecond.

In various embodiments, the keys are stored on a computing device that hosts the KMS and/or KGS. In some embodiments, the keys are stored on a Hardware Security Module (HSM).

The method can involve determining (e.g., via the KGS as described above in FIG. 1) one or more pairs of applications from a plurality of applications (Step 220). Each pair can include applications that are capable of connecting. For example, there can be applications in the plurality of applications that can communicate with some applications in the plurality of applications but not other applications in the plurality of applications. For example, assume there are four applications, App1, App2, App3, and App4. In this example, App1 can communicate with App2, and App3, but not App4; App2 can communicate with App3 and App4; App3 and App4 cannot communicate. In this example, the one or more pairs are as follows: Pair1: App1, App2; Pair2: App1, App2; Pair3: App1, App3; Pair4: App2, App3; Pair5: App2, App4. In this manner, each application can be included more than once in the one or more pairs. Each of the one or more pairs can be unique.

The plurality of applications can include any application that can communicate via a protocol of the system. The protocol of the system can be Transport Layer Security (TLS), Internet Protocol Security (IPSec), Datagram Transport Layer Security (DTLS), or Extensible Authentication Protocol-Transport Layer Security (EAP-TLS).

In some embodiments, the applications are implemented on desktop computers, smart phones, tablets, server or any combination thereof.

The method can involve upon receiving a request (e.g., by the KMS 115 as described above in FIG. 1) from a first application of the plurality of applications (e.g., APP A 105 as described above in FIG. 1) to connect to a second application of the plurality of applications (e.g., APP B 110 as described above in FIG. 1), finding the pair of the one or more pairs that includes both the first application and the second application and associating one key of the plurality of keys to the pair (Step 230).

For example, continuing with the example above, assume the first application is App1, and the second application is App2. Assume App1 sends a request to connect to App2, then continuing with the example above, the pair of the one or more pairs, Pair1: App1, App2, can be found. For example, the one or more pairs can be stored in a memory of a computing device that the KGS and/or KMS are hosted on, such that finding the pair of the one or more pairs involves retrieving Pair1 from memory.

The one key of the plurality of keys to associate to the pair can be randomly picked from a plurality of keys generated by a KGS as described above with respect to FIG. 1. For example, continuing with the example above: Pair1: App1, App2 can have Key1; Pair2: App1, App2 can have Key2; Pair3: App1, App3 can have Key3; Pair4: App2, App3 can have Key4; and Pair5: App2, App4 can have Key6. In some embodiments, each pair has multiple keys associated with it. For example, Pair1: App1, App2 can have Key1, Key2, Key3; Pair2: App1, App2 can have Key4, Key5, Key6; Pair3: App1, App3 can have Key7, Key8, Key9; Pair4: App2, App3 can have Key10, Key11, Key12; and Pair5: App2, App4 can have Key13, Key14, Key15.

Each key can be a unique key that is used only once for a particular session. For example, assume App1 and App2 have a first session, and Key1 is used to authenticate. Then upon a second session, Key2 can be used to authenticate. Then upon a third session, Key3 is used to authenticate. Once all of App1 and App2's keys are used, then the KMS can add new keys to the Pair1. The new keys can be from a plurality of keys that the KMS has access too, or the KMS can prompt the KGS to generate new keys. In some embodiments, when the number of available keys goes below a threshold, the KGS automatically generates new keys. The threshold can be based on usage (e.g., number of apps that connect to the system).

The method can involve performing by the first application and the second application, mutual authentication using the one key (Step 240). The one key can be transmitted to each of the first application and the second application.

After the mutual authentication is performed, the one key can be deleted from the list of keys associated with the pair, so that each key is only used once.

Each application in the system can request to be connected to other applications in the system, and a pair made for each two applications that can connect. Each time a session is initiated between two applications that can be connected and thus can have a corresponding pair, a unique key associated with the pair can be used to authenticate the session. Each session can have its own unique key for authentication, and when the session terminates the key that is used for the session can be deleted.

Figure 3:
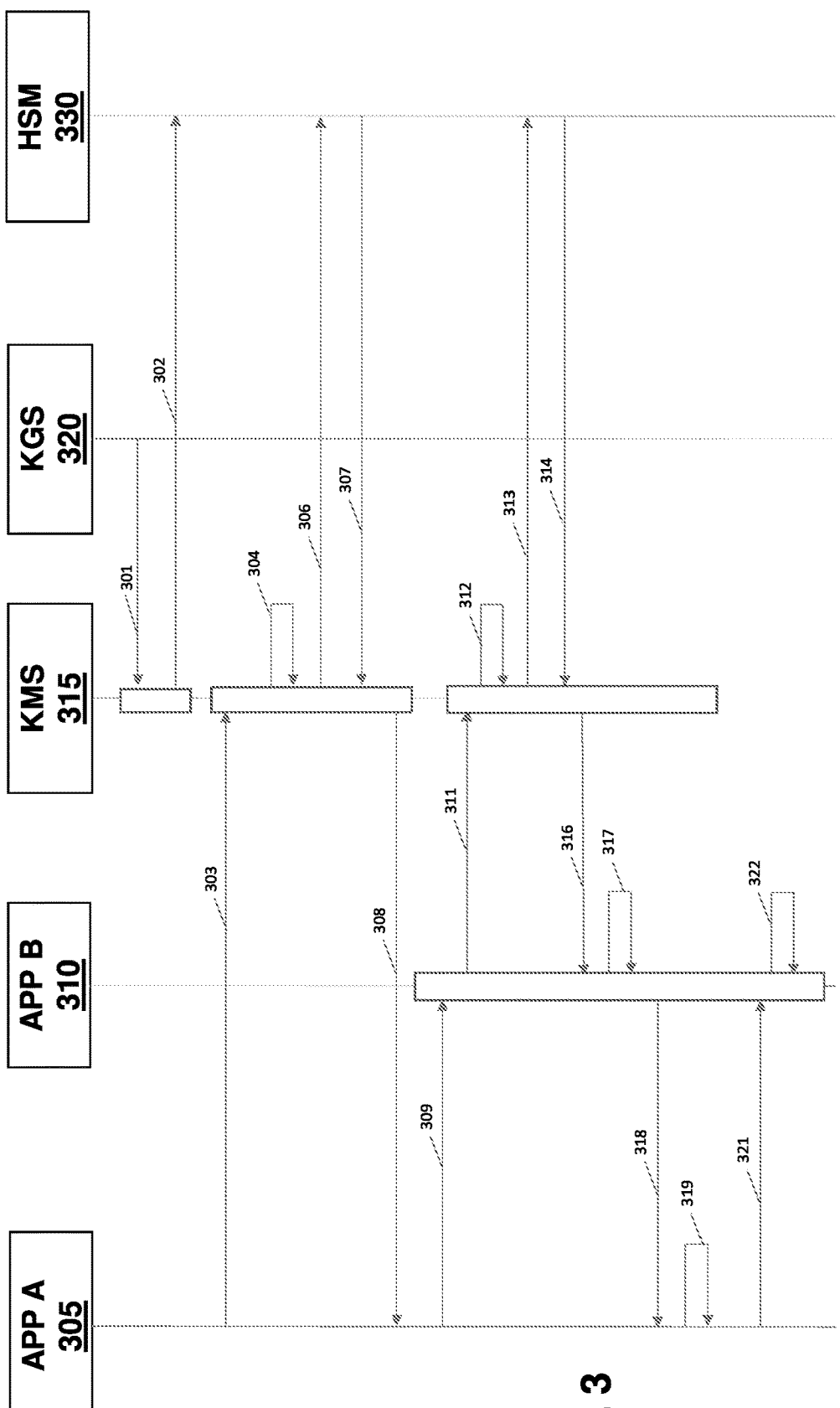
FIG. 3 shows an example of a sequence diagram, according to some embodiments of the invention.

FIG. 3 shows an example of a sequence diagram 300, according to some embodiments of the invention. A KGS 320 (e.g., KGS 125 as described above with respect to FIG. 1), can transmit keys 301 to a KMS 315 (e.g., KMS 115 as described above with respect to FIG. 1). The KMS 315 can transmit the keys 302 to a HSM 330. An APP A 305 (e.g., APP A 105 as described above with respect to FIG. 1) can transmit a request for a key 303 from the KMS 315 to connect to the APP B 310 (e.g., APP B 110 as described above with respect to FIG. 1). The KMS 315 checks 304 that APP A 305 is paired with APP B 310.

The KMS 315 can transmit a request 306 to retrieve a key from the HSM 330. HSM 330 can transmit the key 307 to the KMS 315. The KMS 315 can transmit the key 308 to APP A 305. The APP A 305 can transmit an identity hint 309 to APP B 310. APP B 310 can transmit a request for a key 311 from the KMS 315 to connect to APP A 305.

The KMS 315 checks 312 that APP B 310 is paired with APP A 305. The KMS 315 transmits a request to retrieve a key 313 from the HSM 330. HSM 330 transmits the key 314 to the KMS 315. The KMS transmits the key 316 to the APP B 310. APP B 310 encrypts a message with the key 317. APP B 310 transmits the encrypted message 318 to APP A 305. APP A 305 decrypts the message using the key and encrypts a new message with APP B message within it 319.

APP A 305 transmits an encrypted message 321 to APP B 310. APP B 310 decrypts the received encrypted message, confirms authenticity of the message and accepts connection 322.

FIG. 4 shows a block diagram of a computing device 400 which can be used with embodiments of the invention. Computing device 400 can include a controller or processor 405 that can be or include, for example, one or more central processing unit processor(s) (CPU), one or more Graphics Processing Unit(s) (GPU or GPGPU), a chip or any suitable computing or computational device, an operating system 415, a memory 420, a storage 430, input devices 435 and output devices 440.

Operating system 415 can be or can include any code segment designed and/or configured to perform tasks involving coordination, scheduling, arbitration, supervising, controlling or otherwise managing operation of computing device 400, for example, scheduling execution of programs. Memory 420 can be or can include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 420 can be or can include a plurality of, possibly different memory units. Memory 420 can store for example, instructions to carry out a method (e.g., code 425), and/or data such as user responses, interruptions, etc.

Executable code 425 can be any executable code, e.g., an application, a program, a process, task or script. Executable code 425 can be executed by controller 405 possibly under control of operating system 415. For example, executable code 425 can when executed cause masking of personally identifiable information (PII), according to embodiments of the invention. In some embodiments, more than one computing device 400 or components of device 400 can be used for multiple functions described herein. For the various modules and functions described herein, one or more computing devices 400 or components of computing device 400 can be used. Devices that include components similar or different to those included in computing device 400 can be used, and can be connected to a network and used as a system. One or more processor(s) 405 can be configured to carry out embodiments of the invention by for example executing software or code. Storage 430 can be or can include, for example, a hard disk drive, a floppy disk drive, a Compact Disk (CD) drive, a CD-Recordable (CD-R) drive, a universal serial bus (USB) device or other suitable removable and/or fixed storage unit. Data such as instructions, code, NN model data, parameters, etc. can be stored in a storage 430 and can be loaded from storage 430 into a memory 420 where it can be processed by controller 405. In some embodiments, some of the components shown in FIG. 3 can be omitted.

Input devices 435 can be or can include for example a mouse, a keyboard, a touch screen or pad or any suitable input device. It will be recognized that any suitable number of input devices can be operatively connected to computing device 400 as shown by block 435. Output devices 440 can include one or more displays, speakers and/or any other suitable output devices. It will be recognized that any suitable number of output devices can be operatively connected to computing device 400 as shown by block 440. Any applicable input/output (I/O) devices can be connected to computing device 400, for example, a wired or wireless network interface card (NIC), a modem, printer or facsimile machine, a universal serial bus (USB) device or external hard drive can be included in input devices 435 and/or output devices 440.

Embodiments of the invention can include one or more article(s) (e.g. memory 420 or storage 430) such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein.

In various embodiments, the system is implemented one or more virtual machines. The system (e.g., system of FIG. 1 as described above) and methods (e.g., the methods as described in FIG. 2 and FIG. 3 as described above), can be implemented on any combination of virtual machines. The virtual machines can be implemented on a computing device as described above in FIG. 4, or any computing device as is known in the art that is suitable for allowing implementation of virtual machines.

One skilled in the art will realize the invention can be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

Although embodiments of the invention are not limited in this regard, the terms "plurality" and "a plurality" as used herein can include, for example, "multiple" or "two or more". The terms "plurality" or "a plurality" can be used throughout the specification to describe two or more components, devices, elements, units, parameters, or the like. The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by an apparatus and can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device, a transmitting device, and/or a computing device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), and/or other communication devices. The computing device can be, for example, one or more computer servers. The computer servers can be, for example, part of a server farm. The browser device includes, for example, a computer (e.g., desktop computer, laptop computer, and tablet) with a World Wide Web browser (e.g., Microsoft® Internet Explorer® available from Microsoft Corporation, Chrome available from Google, Mozilla® Firefox available from Mozilla Corporation, Safari available from Apple). The mobile computing device includes, for example, a personal digital assistant (PDA).

Website and/or web pages can be provided, for example, through a network (e.g., Internet) using a web server. The web server can be, for example, a computer with a server module (e.g., Microsoft® Internet Information Services available from Microsoft Corporation, Apache Web Server available from Apache Software Foundation, Apache Tomcat Web Server available from Apache Software Foundation).

The storage module can be, for example, a random access memory (RAM) module, a read only memory (ROM) module, a computer hard drive, a memory card (e.g., universal serial bus (USB) flash drive, a secure digital (SD) flash card), a floppy disk, and/or any other data storage device. Information stored on a storage module can be maintained, for example, in a database (e.g., relational database system, flat database system) and/or any other logical information storage mechanism.

The above-described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

The above described networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth®, code-division multiple access (CDMA) network, time division multiple access (TDMA) network, global system for mobile communications (GSM) network), and/or other circuit-based networks.

Some embodiments of the present invention may be embodied in the form of a system, a method or a computer program product. Similarly, some embodiments may be embodied as hardware, software or a combination of both. Some embodiments may be embodied as a computer program product saved on one or more non-transitory computer readable medium (or media) in the form of computer readable program code embodied thereon. Such non-transitory computer readable medium may include instructions that when executed cause a processor to execute method steps in accordance with embodiments. In some embodiments the instructions stores on the computer readable medium may be in the form of an installed application and in the form of an installation package.

Such instructions may be, for example, loaded by one or more processors and get executed. For example, the computer readable medium may be a non-transitory computer readable storage medium. A non-transitory computer readable storage medium may be, for example, an electronic, optical, magnetic, electromagnetic, infrared, or semiconductor system, apparatus, or device, or any combination thereof.

Computer program code may be written in any suitable programming language. The program code may execute on a single computer system, or on a plurality of computer systems.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

In the foregoing detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention. Some features or elements described with respect to one embodiment can be combined with features or elements described with respect to other embodiments.

What is claimed is:

1. A method for secure authentication between applications that may be attacked with an attack originating from a quantum computer, the method comprising:

generating, by a computing device, a plurality of keys, wherein each key of the plurality of keys is unique;

registering, by the computing device, a plurality of applications that are communicating over a public network, wherein upon registering, each application of the plurality of application is assigned a unique identifier;

receiving, by the computing device, one or more requests to pair from one or more of the applications to another of the one or more applications;

creating, by the computing device, one or more pairs of applications based on the one or more requests wherein each pair indicates that the two applications in the pair can connect, wherein whether the pair can connect is based on whether the two applications are allowed to communicate;

upon receiving a connection request from a first application of the plurality of applications to a second application of the plurality of applications, by the computing device, finding the pair of the one or more pairs that includes both the first application and the second application and associating one key of the plurality of keys to the pair;

transmitting, by the computing device, the one key to the first application and the second application of the plurality of applications; and performing by the first application and the second application, mutual authentication using the one key such that a quantum computer attack is prevented.

2. The method of claim 1 further comprising removing by the computing device, the one key from the plurality of keys once it is transmitted.

3. The method of claim 1 further comprising:

after a first session between the first application and the second application ends, upon receiving a second request to establish a connection between the first application of the plurality of applications and the second application of the plurality of applications or from the second application of the plurality of applications and the first application, finding the pair of the one or more pairs that includes both the first application and the second application and associating a second key of the plurality of keys to the pair, wherein the second key is different than the one key.

4. The method of claim 1 further comprising:

upon receiving a second request to establish a connection between a third application of the plurality of applications and a fourth application of the plurality of applications, finding the pair of the one or more pairs that includes both the third application and the fourth application and associating a second key of the plurality of keys to the pair, wherein the second key is different than the one key.

5. The method of claim 1 further comprising storing the plurality of keys in a hardware security module.

6. The method of claim 1 wherein if a number of the plurality of keys is less than a threshold, new keys are generated and added to the plurality of keys.

7. The method of claim 1 wherein each of the plurality of keys is generated by a quantum random number generator, a quantum key distribution device, a hardware security module or any combination thereof.

8. The method of claim 1 wherein the plurality of applications connect via Transport Layer Security or Internet Protocol Security (IPSec).

9. A system for secure authentication between applications that may be attacked with an attack originating from a quantum computer, the system comprising:
a plurality of applications that can transmit requests for connection to at least one other of the plurality of applications;
a processor configured to:
generate a plurality of keys, wherein each key of the plurality of keys is unique,
register a plurality of applications that are communicating over a public network, wherein upon registering, each application of the plurality of application is assigned a unique identifier;
receive one or more requests to pair from one or more of the applications to another of the one or more applications;
create one or more pairs of applications based on the one or more requests, wherein each pair indicates that the two applications in the pair can connect, wherein whether the pair can connect is based on whether the two applications are allowed to communicate;
upon receiving a connection request from a first application of the plurality of applications to a second application of the plurality of applications, by the computing device, finding the pair of the one or more pairs of applications that includes both the first application and the second application and associating one key of the plurality of keys to the pair, and
transmit the one key to the first application and the second application, such that the first application and the second application performs mutual authentication using the one key such that a quantum computer attack is prevented.

10. The system of claim 9 wherein the processor is further configured to remove by the computing device, the one key from the plurality of keys once it is transmitted.

11. The system of claim 9 wherein the processor is further configured to after a first session between the first application and the second application ends, upon receiving a second connection request from the first application of the plurality of applications to the second application of the plurality of applications or from the second application of the plurality of applications and the first application, finding the pair of the one or more pairs that includes both the first application and the second application and associating a second key of the plurality of keys to the pair, wherein the second key is different than the one key.

12. The system of claim 9 wherein the processor is further configured to upon receiving a second a connection request from a third application of the plurality of applications to a fourth application of the plurality of applications, finding the pair of the one or more pairs that includes both the third application and the fourth application and associating a second key of the plurality of keys to the pair, wherein the second key is different than the one key.

13. The system of claim 9 wherein the processor is further configured to store the plurality of keys in a hardware security module.

14. The system of claim 9 wherein if a number of the plurality of keys is less than a threshold, new keys are generated and added to the plurality of keys.

15. The system of claim 9 wherein each of the plurality of keys is generated by a quantum random number generator, a quantum key distribution device, a hardware security module or any combination thereof.

16. The system of claim 9 wherein the plurality of applications connect via Transport Layer Security or Internet Protocol Security (IPSec).

17. A non-transitory computer readable storage medium storing a set of instructions for causing a computer to perform secure authentication between applications in quantum computing, by performing the operations of:
generating a plurality of keys, wherein each key of the plurality of keys is unique;
register a plurality of applications that are communicating over a public network, wherein upon registering, each application of the plurality of application is assigned a unique identifier;
receive one or more requests to pair from one or more of the applications to another of the one or more applications;
create one or more pairs of applications based on the one or more requests, wherein each pair indicates that the two applications in the pair can connect, wherein whether the pair can connect is based on whether the two applications are allowed to communicate;
upon receiving a connection request from a first application of the plurality of applications to a second application of the plurality of applications, by the computing device, finding the pair of the one or more pairs of applications that includes both the first application and the second application and associating one key of the plurality of keys to the pair; and
transmit the one key to the first application and the second application of the plurality of applications; and
performing by the first application and the second application, mutual authentication using the one key such that a quantum computer attack is prevented.

* * * * *